United States Patent
Kim et al.

(10) Patent No.: US 9,831,015 B2
(45) Date of Patent: Nov. 28, 2017

(54) APPARATUS FOR ENHANCING POWER EFFICIENCY

(71) Applicants: UNIVERSITY-INDUSTRY COOPERATION GROUP OF KYUNG HEE UNIVERSITY, Yongin-si, Gyeonggi-do (KR); Chan Hong Kim, Anyang-si, Gyeonggi-do (KR)

(72) Inventors: Chan Hong Kim, Anyang-si (KR); Sun Kyung Kim, Yongin-si (KR)

(73) Assignee: I TO YOU, Seoul (KR)

( * ) Notice: Subject to any disclaimer, the term of this patent is extended or adjusted under 35 U.S.C. 154(b) by 285 days.

(21) Appl. No.: 14/539,272

(22) Filed: Nov. 12, 2014

(65) Prior Publication Data

US 2015/0194251 A1 Jul. 9, 2015

(30) Foreign Application Priority Data

Jan. 7, 2014 (KR) .................. 10-2014-0001929
Apr. 22, 2014 (KR) .................. 10-2014-0048088

(51) Int. Cl.
*H01F 7/10* (2006.01)
*H01B 9/00* (2006.01)
*H02J 3/00* (2006.01)

(52) U.S. Cl.
CPC . *H01B 9/00* (2013.01); *H02J 3/00* (2013.01)

(58) Field of Classification Search
CPC .............. H01F 7/10; H02J 3/00; H01B 9/00

(Continued)

(56) References Cited

U.S. PATENT DOCUMENTS 5,515,230 A * 5/1996 Ashley .................... H02G 7/20
174/36
5,548,082 A * 8/1996 Palmer ............... H01B 11/1091
174/34

(Continued)

FOREIGN PATENT DOCUMENTS

JP 2001-068244 A 3/2001
KR 10-2012-0073743 A 7/2012
KR 10-2012-0088899 A 8/2012

OTHER PUBLICATIONS

Office Action for Korean Application No. 10-2014-0001929 dated Mar. 18, 2014.

(Continued)

*Primary Examiner* — Daniel Kessie
(74) *Attorney, Agent, or Firm* — Sughrue Mion, PLLC

(57) ABSTRACT

Provided is an apparatus for enhancing power efficiency, the apparatus including a magnetic substance configured to generate a magnetic field, a conductive wire configured to pass the magnetic field, and of which one end is electrically connected to a power line to which alternating current (AC) is applied, and a controller connected to another end of the conductive wire, and configured to apply, to the conductive wire, and to prevent a sudden overcurrent a voltage surge from flowing into an electric device. The conductive wire includes a conductive plate, and the conductive plate is disposed in a space in which the magnetic field is generated to be separate from the magnetic substance, and a first width of the conductive plate can be the same as or greater than a second width of the conductive wire.

2 Claims, 10 Drawing Sheets

(58) Field of Classification Search
USPC .............................................................. 307/8
See application file for complete search history.

(56) References Cited

U.S. PATENT DOCUMENTS

| | | | | | |
|---|---|---|---|---|---|
| 5,814,792 | A | * | 9/1998 | Wildi | H05B 3/34 219/213 |
| 2011/0140781 | A1 | | 6/2011 | Kim et al. | |
| 2011/0148202 | A1 | * | 6/2011 | Rada | G05F 1/70 307/52 |
| 2012/0063045 | A1 | * | 3/2012 | Shearon | H02H 3/08 361/65 |
| 2012/0194002 | A1 | * | 8/2012 | Noh | H02J 3/01 307/106 |
| 2016/0054359 | A1 | * | 2/2016 | Kotake | G01R 15/181 324/127 |

OTHER PUBLICATIONS

Office Action for Korean Application No. 10-2014-0001929 dated Jul. 3, 2014.
Chinese office action dated Nov. 16, 2016 in the corresponding CN Application No. 201410601532.0.

* cited by examiner

APPARATUS FOR ENHANCING POWER EFFICIENCY

CROSS-REFERENCE TO RELATED APPLICATIONS

This application claims the priority benefit of Korean Patent Application No. 10-2014-0001929, filed on Jan. 7, 2014, and Korean Patent Application No. 10-2014-0048088, filed on Apr. 22, 2014, in the Korean Intellectual Property Office, the disclosures of which are incorporated herein by reference.

BACKGROUND

1. Field of the Invention

Embodiments of the present invention relate to an apparatus for enhancing power efficiency that may improve the conductivity of a wire and electrical device, thereby reducing a thermal loss by their resistance.

2. Description of the Related Art

Due to a delay in developing environment-friendly alternative energy, an energy shortage issue has emerged as a main issue all over the world. As a method for overcoming such an energy shortage situation, the developments of environment-friendly alternative energy and a highly efficient power device have been conducted. Further, interest on a method capable of enhancing the efficiency of an electrical device using an external device is currently on the rise.

For example, due to a characteristic of an incomplete alternating current (AC) waveform, many electrical devices using AC show a loss by an abnormal voltage and an inharmonic waveform in practice. To outperform the above issue, technology for installing an electric circuit to constantly maintain ideal sinusoidal waveforms in power equipment that is a power supply device is being applied.

Patent document 1: U.S. Patent Laid-Open Publication No. 2011/0140781 A1

The circuit technology for constantly maintaining ideal sinusoidal waveforms of AC current supplied from power equipment may lead to marginally enhance the efficiency of an electrical device, however, cannot be a fundamental solution for dramatically enhancing the efficiency of the electrical device. This is because the efficiency of the electrical device is mainly degraded due to collisions of free electrons, that is, resistance resulting from a random motion of free electrons progressing within a conductive wire and an electrical device itself, and further from a vibratory motion of atoms according thereto. Accordingly, to enhance the efficiency of electrical devices, tone needs to implement a method of converting free electrons in a random motion into their aligned parallel motion in a predetermined direction, thereby decreasing collision events between the free electrons and vibrating atoms or other free electrons and thus increasing the drift velocity of free electrons. In detail, according to an increase in the drift velocity of free electrons, the conductivity of a conductive wire and an electrical device is improved and thus, it may lead to decreasing a thermal loss by resistance; otherwise, which causes a degradation in the efficiency of an electrical device.

SUMMARY

An aspect of the present invention provides an apparatus for enhancing power efficiency that may generate a strong magnetic field, and may improve the drift velocity of free electrons and the conductivity of a conductive wire and an electrical device remote from the apparatus through the magnetic field, thereby enhancing the power efficiency.

Subjects to be solved by the invention are not limited to the aforementioned matters and thus, other subjects and/or matters not described herein may be understood by those skilled in the art from the following description.

According to an aspect of the present invention, there is provided an apparatus for enhancing power efficiency, the apparatus including a magnetic substance configured to generate a magnetic field, a conductive wire configured to pass the magnetic field, and of which one end is electrically connected to a power line with a parallel circuit to which alternating current (AC) is applied; and a controller connected to another end of the conductive wire, and configured to apply, to the conductive wire, to prevent unexpected overcurrent and a surge from flowing into an electrical device. The conductive wire may include a conductive plate, and the conductive plate may be disposed in a space in which the magnetic field is, and a first width of the conductive plate may be the same as or greater than a second width of the conductive wire.

The magnetic field may have a magnitude of about 0.1 T to about 1 T.

The apparatus for enhancing power efficiency may further include an insulating member configured to coat the conductive wire. The conductive plate may not be coated.

The apparatus for enhancing power efficiency may further include a fixing portion disposed between the magnetic substance and the conductive plate, and configured to fix the conductive plate to be located within the coverage of the magnetic field.

The magnetic substance may include a first magnetic substance and a second magnetic substance disposed to be separate from the first magnetic substance. Facing surfaces of the first and second magnetic substances may have different polarities.

The conductive wire may pass between the first magnetic substance and the second magnetic substance.

The magnetic substance may be a solenoid. The solenoid may include a ferromagnetic substance and a solenoid conductive wire configured to surround the ferromagnetic substance. The solenoid conductive wire may be connected to the controller, and may be supplied with power from an independent power source.

The solenoid may include a first solenoid and a second solenoid configured to be separate from the first solenoid. The conductive wire may pass between the first solenoid and the second solenoid.

The magnetic substance may include first and second magnetic substances disposed to be horizontally separate from each other, and a plurality of solenoids configured to surround the first and second magnetic substances. The conductive wire may pass a portion in which magnetic fields generated by the first magnetic substance, the second magnetic substance, and the plurality of solenoids overlap, between the first and second magnetic substances.

The apparatus for enhancing power efficiency may further include an encapsulation material configured to mold a space in which the magnetic substance and the conductive plate are disposed.

According to another aspect of the present invention, there is provided an apparatus for enhancing power efficiency, the apparatus including a plurality of magnetic field generators configured to correspond to a plurality of power lines having different phases in a one-to-one manner, a plurality of conductive wires of which ones end are electrically connected to the plurality of power lines in a one-toone manner with a parallel circuit for each configuration, and configured to pass magnetic fields generated by the plurality of magnetic field generators, respectively, and a controller connected to another ends of the plurality of conductive wires, and configured to control voltage and current flowing in the plurality of conductive wires.

The controller may apply, to each of the plurality of conductive wires, to prevent overcurrent and a surge from flowing into an electrical device, and each of the plurality of magnetic field generators may generate a magnetic field of about 0.1 T to about 1 T.

Each of the plurality of conductive wires may include a conductive wire portion coated with an insulating member, and a conductive plate. The conductive plate may be located within the coverage of magnetic fields generated by the plurality of magnetic field generators.

Each of the plurality of magnetic field generators may include a magnetic substance configured to generate the magnetic field, a fixing portion disposed between the magnetic substance and the conductive plate, and an encapsulation material configured to mold the magnetic substance, the fixing portion, and the conductive plate.

According to still another aspect of the present invention, there is provided an apparatus for enhancing power efficiency, the apparatus including a magnetic substance configured to generate a magnetic field, a first conductive wire configured to pass the magnetic field, and of which one end is electrically connected to an AC power portion with a series circuit, a controller connected to another end of the first conductive wire, and configured to prevent overcurrent and a surge from flowing into an electrical device, and a second conductive wire configured to connect between the controller and a load with a series circuit.

The first conductive wire may include a conductive plate, and the conductive plate may be disposed within the coverage of the magnetic field to be separate from the magnetic substance. A first width of the conductive plate may be greater than a second width of the conductive wire.

The magnetic field may have a magnitude of about 0.1 T to about 1 T.

A plurality of magnetic substances may be provided, and the first conductive wire may be disposed in a portion in which magnetic fields generated by the plurality of magnetic substances overlap.

The apparatus for enhancing power efficiency may further include an insulating member configured to coat the first conductive wire, and not to coat the conductive plate.

The apparatus for enhancing power efficiency may further include a fixing portion disposed between the magnetic substance and the conductive plate, and configured to fix the conductive plate to be located within the coverage of the magnetic field.

The magnetic substance may include a first magnetic substance and a second magnetic substance disposed to be separate from the first magnetic substance. Facing surfaces of the first and second magnetic substances may have different polarities.

The first conductive wire may pass between the first magnetic substance and the second magnetic substance.

The magnetic substance may be a solenoid.

The solenoid may include a solenoid core, and a solenoid conductive wire configured to surround the solenoid core. The solenoid conductive wire may be connected to the controller, and may be supplied with power from the controller.

The solenoid may include a first solenoid and a second solenoid disposed to be separate from the first solenoid. The first conductive wire may pass between the first solenoid and the second solenoid.

Other detailed matters of the invention are included in the detailed description and drawings.

According to embodiments of the present invention, it is possible to decrease an amount of power used at a load including a wire and an electrical device by enhancing the power efficiency of the load.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
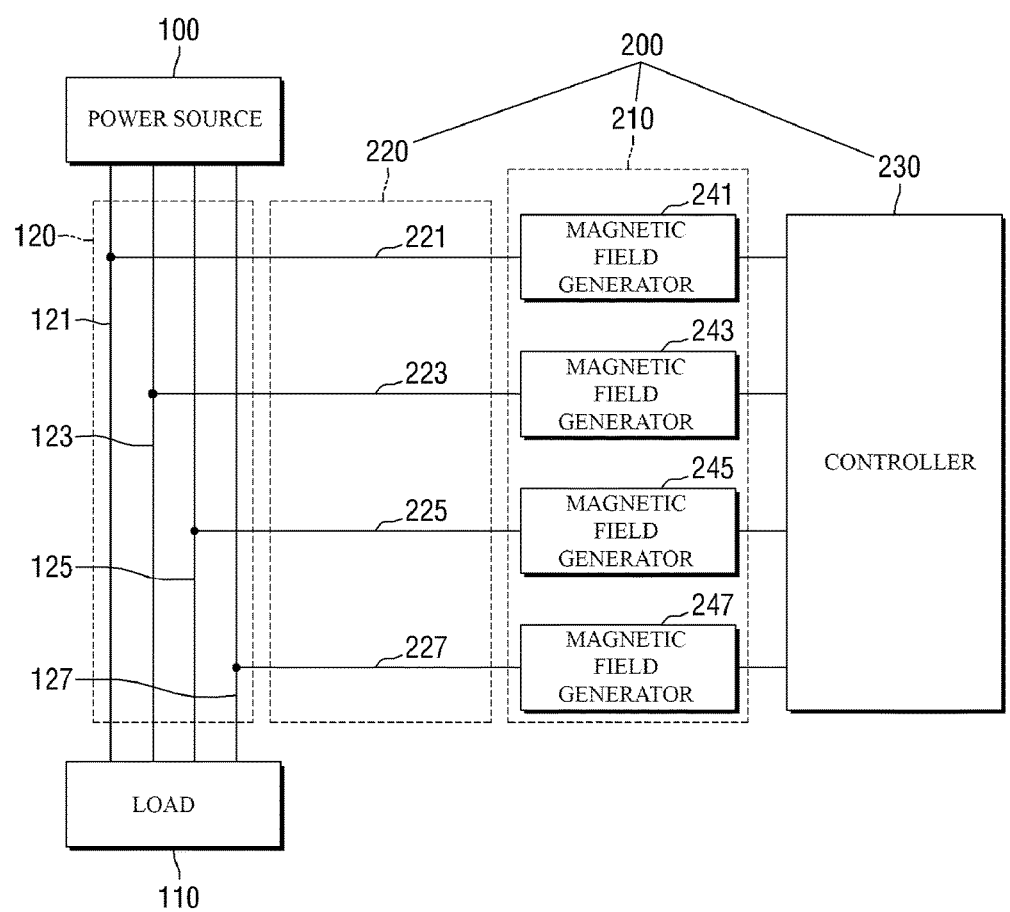
FIG. 1 is a block diagram illustrating an apparatus for enhancing power efficiency according to an embodiment of the present invention.

Advantages and features of the present invention and a method for achieving the same will become clear by referring to embodiments, examples of which are illustrated in the accompanying drawings. However, the present invention is not limited thereto and thus, may be configured in different various embodiments. The embodiments are provided to supplement the disclosure of the present invention and to fully inform those skilled in the art of the scope of the invention and may be defined by the scope of the claims. Sizes and relative sizes of constituent components illustrated in the drawings may be exaggerated for clarity of description. Like reference numerals refer to like components throughout and the expression "and/or" may include each of and all combinations of at least one of the aforementioned items.

That an element or a layer is disposed "on" another element or layer includes all of a case in which the element or the layer is disposed directly on the other element or layer and a case in which still another element or layer is disposed therebetween. On the contrary, that an element or a layer is disposed "directly on" another element or layer indicates that still another element or layer is not disposed therebetween.

Spatially relative terms "below", "beneath", "lower", "above", and "upper" may be used to easily describe relationships between a single element and another element or between constituent components and other constituent components, illustrated in the drawings. The spatially relative terms need to be understood as terms including different directions of an element when the element is used or operates, in addition to directions illustrated in the drawings. For example, when an element illustrated in the drawing is reversed, an element described to be disposed "below" or "beneath" another element may be disposed "above" the other element. Accordingly, the example term "below" may include all the directions indicating "below" and "above". An element may be oriented in a different direction and accordingly, spatially relative terms may be interpreted based on the orientation.

The terms used herein are to describe the embodiments and is not to limit the present invention. As used herein, the singular forms "a", "an" and "the" are intended to include the plural form as well, unless the context clearly indicates otherwise. It will be further understood that the terms "includes/comprises" and/or "including/comprising" when used in this specification do not preclude the presence or addition of one or more other constituent components in addition to the aforementioned constituent components.

Although the terms "first", "second", and the like are used to describe a variety of elements or constituent components, the elements or the constituent components are not limited by the terms. The terms are used to distinguish a single element or constituent component from another element or constituent component. Accordingly, the term "first element" or "first constituent element" used in the following may also refer to a "second element" or a "second constituent element" within the technical spirit of the present invention.

Unless otherwise defined, all the terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
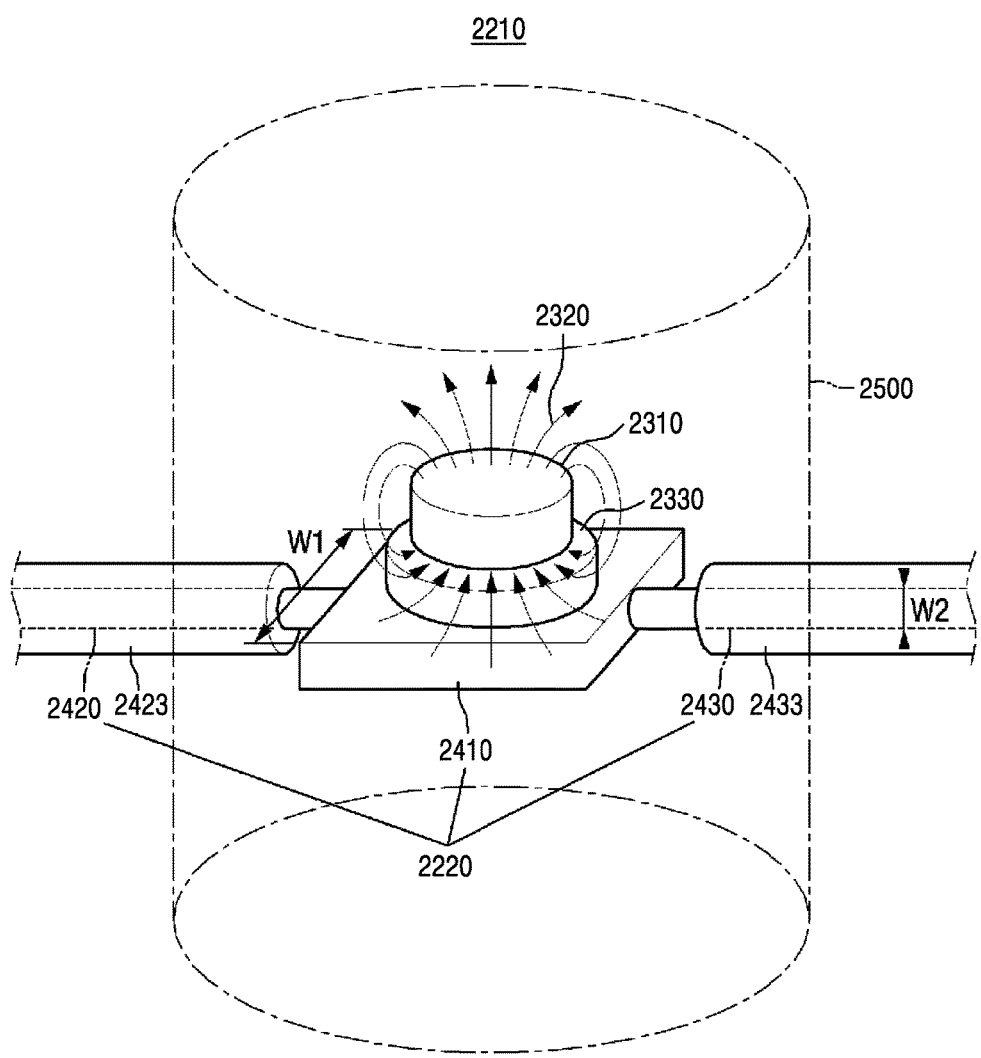
FIG. 2 is a perspective view of a magnetic field generator according to an embodiment of FIG. 1.

Hereinafter, an apparatus (hereinafter, also referred to as a power efficiency enhancing apparatus) 200 for enhancing power efficiency according to an embodiment of the present invention will be described with reference to FIGS. 1 and 2. FIG. 1 is a block diagram illustrating the power efficiency enhancing apparatus 200 according to an embodiment of the present invention. FIG. 2 is a perspective view of a magnetic field generator 210 according to the embodiment of FIG. 1.

Referring to FIG. 1, the power efficiency enhancing apparatus 200 may be connected in parallel to a power line 120 disposed between a power source 100 and a load 110. The power source 100 supplies power to the load 110, and the load 110 is supplied with the power from the power source 100 and thereby operates. The load 110 may be any device that uses power, for example, production equipment, a mechanical device, and a building.

The power line 120 connects between the power source 100 and the load 110, and supplies the power to the load 110. An alternating current (AC) voltage may be applied to the power line 120. The power line 120 may include first through fourth power lines 121, 123, 125, and 127. The first through fourths power lines 121, 123, 125, and 127 may have the same voltage and different phases. Although FIG. 1 illustrates that the power line 120 is provided in a 3-phase-and-4-line structure and includes four power lines, for examples, the first through fourth power lines 121, 123, 125, and 127, the present invention is not limited thereto. For example, the power line 120 may be provided in a 3-phase-and-3-line structure lines and may include three power lines. Also, the power line 120 may be provided in a 4-phase structure, instead of a 3-phase structure.

The power efficiency enhancing apparatus 200 may include then magnetic field generator 210, a conductive wire 220, and a controller 230.

The magnetic field generator 210 generates a strong magnetic field. The generated magnetic field may enhance the conductivity of the conductive wire 220 disposed between the power line 120 and the load 110 by increasing the drift velocity of free electrons within the conductive wire 220 disposed between the power line 120 and the load 110.

The magnetic field generator 210 may generate a magnetic field of about 0.1 T to about 1 T. The magnetic field of less than 0.1 T may be slightly insufficient to enhance the power efficiency of the load 110 and may not readily generate the magnetic field beyond 1 T. Also, the conductivity of the conductive wire 220 may decrease according to an increase in the magnitude of the magnetic field, and an expected lifetime of the magnetic field generator 210 may decrease.

The conductive wire 220 is required to apply the effect of the magnetic field to the load 110 and the power line 100. One end of the conductive wire 220 is connected to the power line 120, and another end of the conductive wire 220 is connected to the controller 230. The conductive wire 220 is not directly connected to the magnetic field generator 210, and passes the magnetic field generated by the magnetic field generator 210.

The controller 230 is connected to the other end of the conductive wire 220. The other end of the conductive wire 220 is finally connected to the power line 120 in parallel. The controller 230 may control a voltage serge and overcurrent that may flow in the load 110.

Each of the number of magnetic field generators included in the magnetic field generator 210 and the number of conductive wires included in the conductive wire 220 may correspond to the number of power lines included in the power line 120. For example, when the power line 120 includes four power lines, the number of magnetic field generators included in the magnetic field generator 210 may be four and the number of conductive wires included in the conductive wire 220 may also be four. Since the power line 120 includes four power lines, for example, the first through fourth power lines 121, 123, 125, and 127, the number of magnetic field generators included in the magnetic field generator 210 may be four to correspond to the first through fourth power lines 121, 123, 125, and 127, respectively. The number of conductive wires included in the conductive wire 220 may also be four to correspond to the first through fourth power lines 121, 123, 125, and 127, respectively. In detail, one end of a first sub-conductive wire 221 may be connected to the first power line 121, the first sub-conductive wire 221 may pass a magnetic field generated by a first magnetic field generator 241, and another end of the first sub-conductive wire 221 may be connected to the controller 230. One end of a second sub-conductive wire 223 may be connected to the second power line 123, the second sub-conductive wire 223 may pass a magnetic field generated by a second magnetic field generator 243, and another end of the second sub-conductive wire 223 may be connected to the controller 230. One end of a third sub-conductive wire 225 may be connected to the third power line 125, the third sub-conductive wire 225 may pass a magnetic field generated by a third magnetic field generator 245, and another end of the third sub-conductive wire 225 may be connected to the controller 230. One end of a fourth sub-conductive wire 227 may be connected to the fourth power line 127, the fourth sub-conductive wire 227 may pass a magnetic field generated by a fourth magnetic field generator 247, and another end of the fourth sub-conductive wire 227 may be connected to the controller 230.

Hereinafter, the magnetic field generator 210 of FIG. 1 will be described with reference to FIG. 2. Referring to FIG. 1, the magnetic field generator 210 includes the first through fourth magnetic field generators 241, 243, 245, and 247, and the four first through fourth magnetic field generators 241, 243, 245, and 247 are provided in the same shape and thus, a description will be made only once.

The magnetic field generator 2210 of FIG. 2 may include a magnetic substance 2310 and a fixing portion 2330. The magnetic substance 2310 may generate a strong magnetic field 2320. The magnetic substance 2310 may generate the magnetic field 2320 having a magnitude of about 0.1 T to about 1 T. Although the magnetic substance 2310 is illustrated in a circular shape, the present invention is not limited thereto.

The fixing portion 2330 may be disposed between a conductive plate 2410 and the magnetic substance 2310, and may prevent the conductive plate 2410 from contacting with the magnetic substance 2310. The conductive plate 2410 may be disposed to be separate from the magnetic substance 2310 by the fixing portion 2330. Also, the fixing portion 2330 may fix the conductive plate 2410 to be located within the magnetic field 2320.

Although it is possible to attach the magnetic substance 2310 and the conductive plate 2410 to the fixing portion 2330 by applying adhesives on the surface of the fixing portion 2300, the present invention is not limited thereto. The fixing portion 2330 may be made of a material aside from a conductive material.

The conductive wire 2220 passing the magnetic field generator 2210 may include the conductive plate 2410, a first conductive wire portion 2420, and a second conductive wire portion 2430. The first conductive wire portion 2420 may be coated with a first insulating member 2423 to prevent an occurrence of short and to protect the first conductive wire portion 2420 from an external environment. The first conductive wire portion 2420 may be connected to the power line 120 of FIG. 1.

Also, the second conductive wire portion 2430 may be coated with a second insulating member 2433 to prevent an occurrence of short and to protect the second conductive wire portion 2430 from an external environment. The second conductive wire portion 2430 may be connected to the controller 230.

The conductive plate 2410 may be disposed between the first conductive wire portion 2420 and the second conductive wire portion 2430. The conductive plate 2410 may pass the space formed by the magnetic field 2320 and thereby be affected by the magnetic field 2320. The conductive plate 2410 may be formed to have a larger area than the first and second conductive wire portions 2420 and 2430 in order to receive a possibly great effect from the magnetic field 2320. In detail, a first width W1 of the conductive plate 2410 is the same as or greater than a second width W2 of the first and second conductive wire portions 2420 and 2430. Due to the large area of the conductive plate 2410, it is possible to expand an area corresponding to the space formed by the magnetic field 2420 compared to the first and second conductive wire portions 2420 and 2430. The conductive plate 2410 may be disposed to be separate from the magnetic substance 2310 within the coverage of the magnetic field 2320 by the fixing portion 2330. Although FIG. 2 illustrates that the conductive plate 2410 is disposed to be below the magnetic substance 2310, the present invention is not limited thereto. The fixing portion 2330 and the conductive plate 2410 may be formed in a multilayered structure on the magnetic substance 2310.

When the conductive plate 2410 is affected by the magnetic field 2320, it is possible to sequentially increase the drift velocity of free electrons within the first and second conductive wire portions 2420 and 2430, the power line 120 of FIG. 1, and a conductive wire of the load 110 of FIG. 1, subsequently.

An encapsulation material 2500 may mold the magnetic substance 2310, the fixing portion 2330, and the conductive plate 2410, and the like, to protect the same from, for example, an external environment, an external impact, and the like. The encapsulation material 2500 may be a nonconductive material, for example, epoxy, however, the present invention is not limited thereto. Although the encapsulation material 2500 is illustrated in a cylindrical shape, the present invention is not limited thereto and thus, the encapsulation material 2500 may be provided in a variety of shapes.

Meanwhile, in the case of forming the encapsulation material 2500, the fixing portion 2330 may not be provided. That is, a portion in which the fixing portion 2330 is to be disposed may be molded by the encapsulation material 2500. Accordingly, instead of the fixing portion 2330, the encapsulation material 2500 may perform the roles of separating the conductive plate 2410 and the magnetic substance 2310 from each other and fixing the conductive plate 2410.

Figure 3:
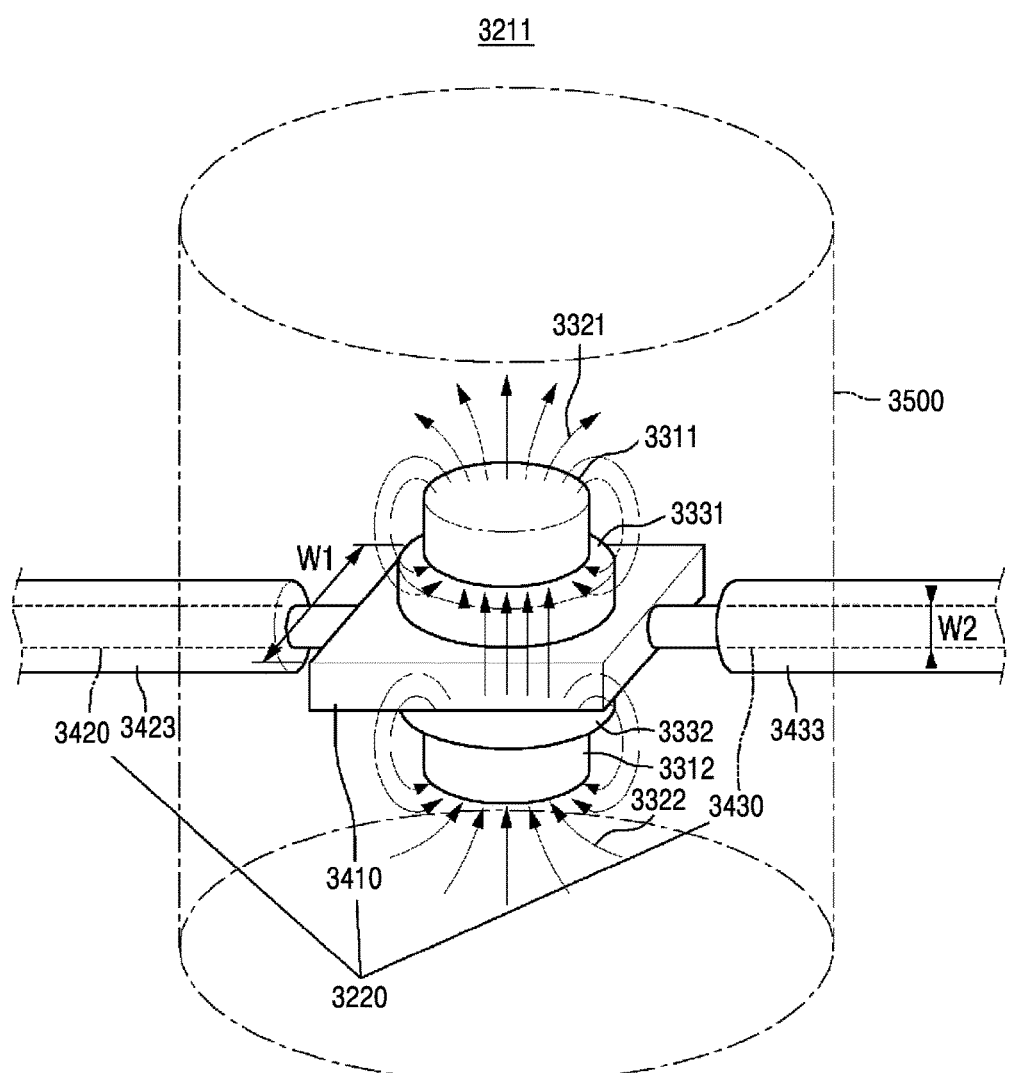
FIG. 3 is a perspective view of a magnetic field generator according to another embodiment of FIG. 1.

A magnetic field generator 3211 according to another embodiment will be described with reference to FIG. 3. A description repeating the aforementioned description will be omitted and a description will be made based on a difference. FIG. 3 is a perspective view of the magnetic field generator 3211 according to another embodiment of FIG. 1.

Referring to FIG. 3, the magnetic field generator 3211 may include a plurality of magnetic substances, for example, a first magnetic substance 3311 and a second magnetic substance 3312. For example, the first magnetic substance 3311 may be disposed, and the second magnetic substance 3312 may be disposed to be separate from the first magnetic substance 3311. Although FIG. 3 illustrates that the first and second magnetic substances 3311 and 3312 are vertically disposed, the present invention is not limited thereto. Also, for example, at least three magnetic substances may be disposed.

The first magnetic substance 3311 may generate a first magnetic field 3321, and the second magnetic substance 3312 may generate a second magnetic field 3322. When the first magnetic field 3321 and the second magnetic field 3322 overlap, the magnetic of a magnetic field increases. Thus, the first magnetic substance 3311 and the second magnetic substance 3312 are separate from each other sufficient for the first magnetic field 3321 and the second magnetic field 3322 to overlap. One surface of the first magnetic substance 3311 and one surface of the second magnetic substance 3312 that face each other may have different polarities to constructively couple the first magnetic field 3321 and the second magnetic field 3322 between the first and the second magnetic substances 3311 and 3312. As an example, in FIG. 3, a bottom surface of the first magnetic substance 3311 is an S pole and a top surface of the second magnetic substance 3312 is an N pole.

The magnetic field has the largest magnitude between the first and second magnetic substances 3311 and 3312 and thus, the conductive wire 220 may pass between the first and second magnetic substances 3311 and 3312. To dispose the conductive plate 3410 between the first and second magnetic substances 3311 and 3312, a first fixing portion 3331 may be disposed between the conductive plate 3410 and the first magnetic substance 3311, and a second fixing portion 3332 may be disposed between the conductive plate 3410 and the second magnetic substance 3312. The first and second fixing portions 3331 and 3332 may be made of a material aside from a conductive material.

A sum of magnitudes of the first and second magnetic fields 3321 and 3322 generated by the first and second magnetic substances 3311 and 3312 may be about 0.1 T to about 1 T.

The encapsulation material 3500 may be formed to mold the first and second magnetic substances 3311 and 3312, the conductive plate 3410, and the first and second fixing portions 3331 and 3332.

Figure 4:
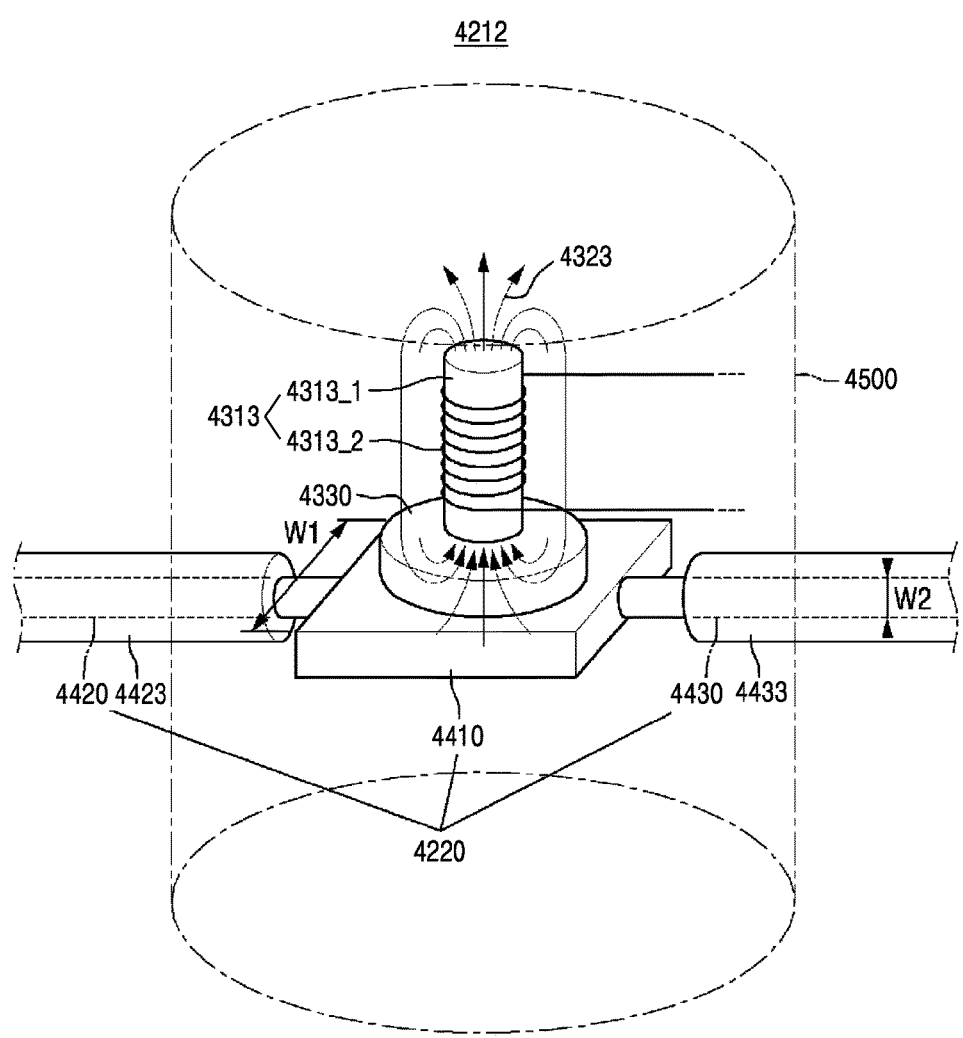
FIG. 4 is a perspective view of a magnetic field generator according to still another embodiment of FIG. 1.

Hereinafter, a magnetic field generator 4212 according to still another embodiment will be described with reference to FIG. 4. A description repeating the aforementioned description will be omitted and a description will be made based on a difference. FIG. 4 is a perspective view of the magnetic field generator 4212 according to another embodiment of FIG. 1.

Referring to FIG. 4, the magnetic field generator 4212 may generate a magnetic field 4323 using a solenoid 4313. In detail, the solenoid 4313 may include a solenoid core 4313_1 and a solenoid conductive wire 4313_2 configured to surround the solenoid core 4313_1. The solenoid core 4313_1 may be a ferromagnetic substance. When an independent power generator is supplied to the solenoid conductive wire 4313_2 and current flows, the magnetic field 4323 is generated in the solenoid 4313 as illustrated in FIG. 4. The conductive plate 4410 may be disposed to pass the magnetic field 4323. The fixing portion 4330 may be disposed between the solenoid 4313 and the conductive plate 4410 so that the conductive plate 4410 may be disposed within the coverage of the magnetic field 4323. In this instance, the fixing portion 4330 may fix the conductive plate 4410 to be separate from the solenoid 4313.

Dissimilar to the magnetic field generator 2210 of FIG. 2, when using the solenoid 4313 as a magnetic substance, the power needs to be supplied to the solenoid 4313 in order to generate the magnetic field 4323. Accordingly, additional power is used. However, an amount of power saved at the load 110 of FIG. 1 is significantly greater than an amount of power used to generate the magnetic field 4323. Also, although the magnitude of the magnetic field 2320 of the magnetic substance 2310 may decrease over time, the magnitude of the magnetic field 4323 is constant over time in the case of using the solenoid 4313.

The magnetic field 4323 of the solenoid 4313 may have the magnitude of about 0.1 T to about 1 T.

Figure 5:
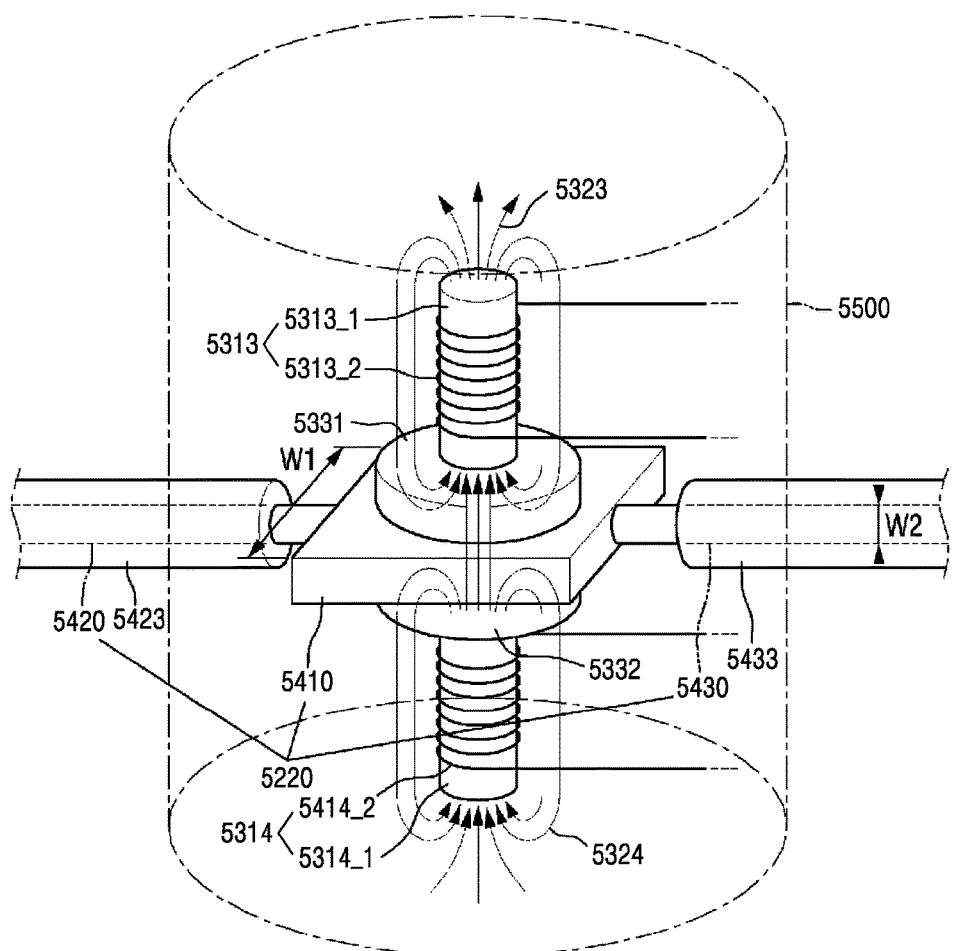
FIG. 5 is a perspective view of a magnetic field generator according to still another embodiment of FIG. 1.

Hereinafter, a magnetic field generator 5213 according to still another embodiment will be described. A description repeating the aforementioned description will be omitted and a description will be made based on a difference. FIG. 5 is a perspective view of the magnetic field generator 5213 according to another embodiment of FIG. 1.

Referring to FIG. 5, the magnetic field generator 5213 may include a plurality of solenoids. For example, a first solenoid 5313 may be disposed and a second solenoid 5314 may be disposed to be separate from the first solenoid 5313. Although FIG. 5 illustrates that the first and second solenoids 5313 and 5314 are vertically disposed, the present invention is not limited thereto. Also, for example, at least three solenoids may be disposed. The first solenoid 5313 may include a first solenoid core 5313_1 and a first solenoid conductive wire 5313_2 configured to surround the first solenoid core 5313_1. The second solenoid 5314 may include a second solenoid core 5314_1 and a second solenoid conductive wire 5314_2 configured to surround the second solenoid core 5314_1

The first solenoid 5313 may generate a first magnetic field 5323 and the second solenoid 5314 may generate a second magnetic field 5324. When the first magnetic field 5323 and the second magnetic field 5324 are coupled, the magnitude of a magnetic field increases. Thus, the first solenoid 5313 and the second solenoid 5314 are separate from each other sufficient for the first magnetic field 5323 and the second magnetic field 5324 to overlap. One surface of the first solenoid 5313 and one surface of the second solenoid 5314 that face each other may have different polarities to constructively couple the first magnetic field 5323 and the second magnetic field 5324 between the first and second solenoids 5313 and 5314. As an example, in FIG. 5, a bottom surface of the first solenoid 5313 is an S pole and a top surface of the second solenoid 5314 is an N pole.

The magnetic field has the largest magnitude between the first and second solenoids 5313 and 5314 and thus, the conductive wire 5220 may pass between the first and second solenoids 5313 and 5314. To dispose the conductive plate 5410 between the first and second solenoids 5313 and 5314, the first fixing portion 5331 may be disposed between the conductive plate 5410 and the first solenoid 5313 and the second fixing portion 5332 may be disposed between the conductive plate 5410 and the second solenoid 5314.

A sum of magnitudes of the first and second magnetic fields 5323 and 5324 generated by the first and second solenoids 5313 and 5314 may be about 0.1 T to about 1 T.

The encapsulation material 5500 may be formed to mold the first and second solenoids 5313 and 5314, the conductive plate 5410, and the first and second fixing portions 5331 and 5332.

Figure 6:
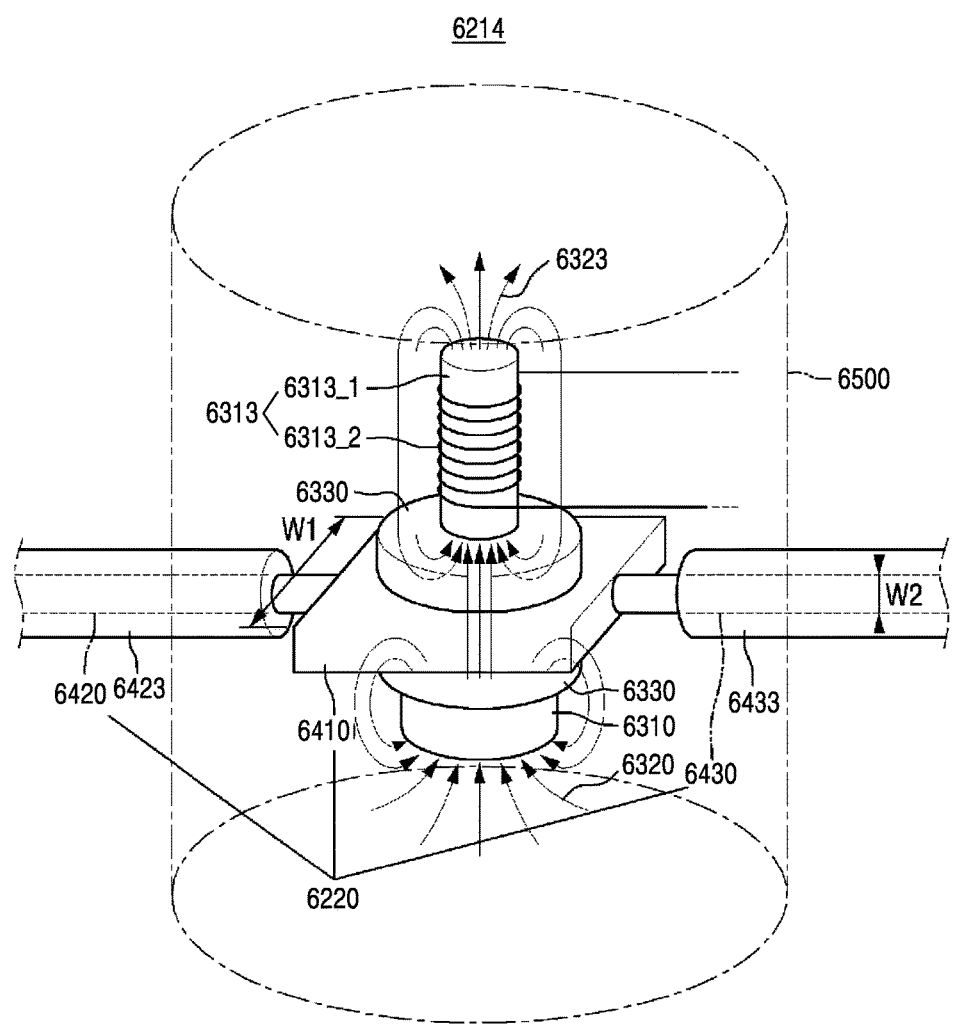
FIG. 6 is a perspective view of a magnetic field generator according to still another embodiment of FIG. 1.

Hereinafter, a magnetic field generator 6214 according to still another embodiment will be described. A description repeating the aforementioned description will be omitted and a description will be made based on a difference. FIG. 6 is a perspective view of the magnetic field generator 6214 according to another embodiment of FIG. 1.

Referring to FIG. 6, the magnetic field generator 6214 may include the solenoid 6313 and the magnetic substance 6310. For example, the solenoid 6313 may be disposed and the magnetic substance 6310 may be disposed to be separate from the solenoid 6313. Although FIG. 6 illustrates that the solenoid 6313 is disposed above the magnetic substance 6310, the present invention is not limited thereto and thus, the solenoid 6313 may be disposed below the magnetic substance 6310.

The solenoid 6313 may include the solenoid core 6313_1 and the solenoid conductive wire 6313_2 configured to surround the solenoid core 6313_1. The solenoid conductive wire 6313_2 may be connected to the controller 230 of FIG. 1 and may be supplied with power.

The solenoid 6313 and the magnetic substance 6310 may generate the magnetic fields 6323 and 6320. To couple the magnetic fields 6323 and 6320, one surface of the solenoid 6313 and one surface of the magnetic substance 6310 that face each other may have different polarities. As an example, in FIG. 6, a bottom surface of the solenoid 6313 is an S pole and a top surface of the magnetic substance 6310 is an N pole.

The conductive wire 6220, particularly, the conductive plate 6410 may pass between the solenoid 6313 and the magnetic substance 6310. To dispose the conductive plate 6410 between the solenoid 6313 and the magnetic substance 6310, the fixing portions 6330 may be disposed between the conductive plate 6410 and the solenoid 6313, and between the conductive plate 6410 and the solenoid 6310, respectively.

A sum of magnitudes of the magnetic fields 6323 and 6320 generated by the solenoid 6313 and the magnetic substance 6310 may be about 0.1 T to about 1 T.

The encapsulation material 6500 may be formed to mold the solenoid 6313, the magnetic substance 6310, the conductive plate 6410, and the fixing portions 6330.

Figure 7:
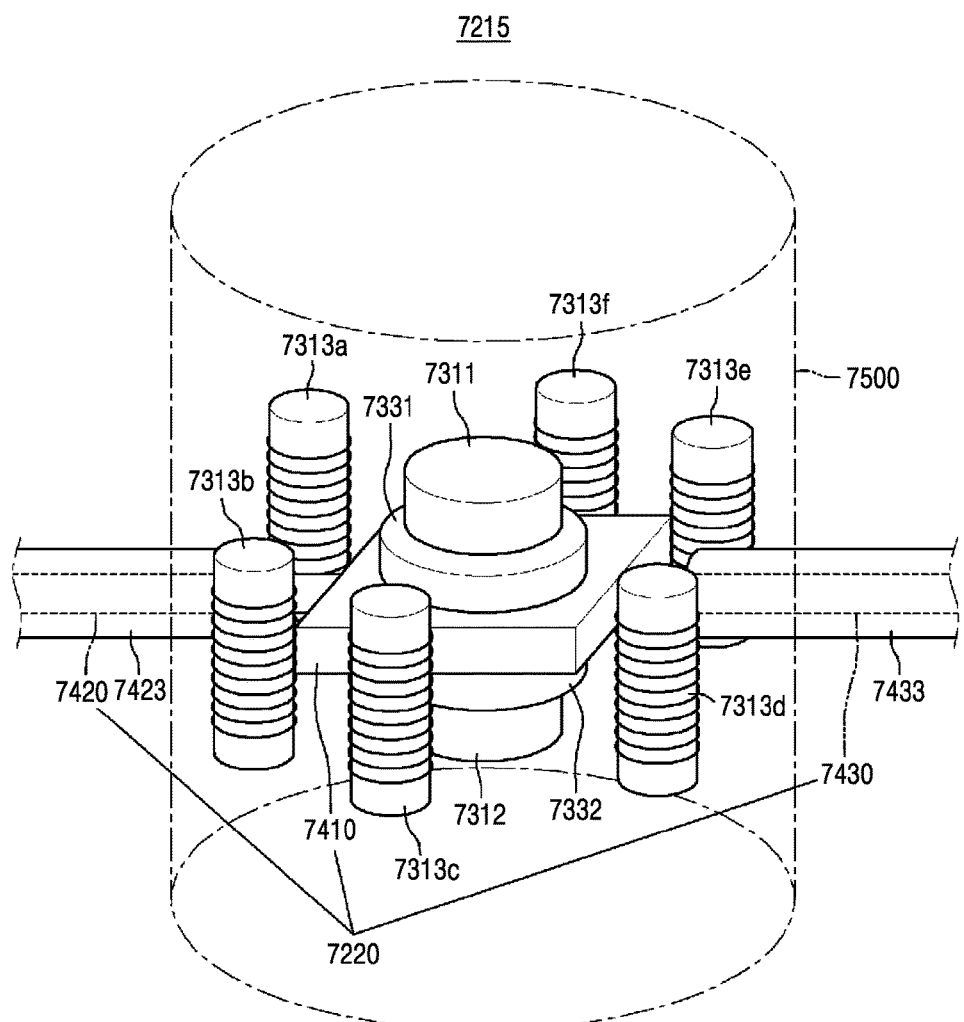
FIG. 7 is a perspective view of a magnetic field generator according to still another embodiment of FIG. 1.

Hereinafter, a magnetic field generator 7215 according to still another embodiment will be described. A description repeating the aforementioned description will be omitted and a description will be made based on a difference. FIG. 7 is a perspective view of the magnetic field generator 7215 according to another embodiment of FIG. 1.

Referring to FIG. 7, the magnetic field generator 7215 may include a plurality of magnetic substances, for example, the first magnetic substance 7311 and the second magnetic substance 7312 and a plurality of solenoids 7313a, 7313b, 7313c, 7313d, 7313e, and 7313f. The plurality of solenoids 7313a, 7313b, 7313c, 7313d, 7313e, and 7313f may be replaced with permanent magnet. In detail, similar to the magnetic field generator 3211 of FIG. 3, the first magnetic substance 7311 and the second magnetic substance 7312 may be disposed and the plurality of solenoids 7313a, 7313b, 7313c, 7313d, 7313e, and 7313f may be disposed to surround the first and second magnetic substances 7311 and 7312. The plurality of solenoids 7313a, 7313b, 7313c, 7313d, 7313e, and 7313f, and the plurality of magnetic substances, for example, the first magnetic substance 7311 and the second magnetic substance 7312 are disposed to be mutually separate. Although FIG. 7 illustrates that the number of the plurality of solenoids 7313a, 7313b, 7313c, 7313d, 7313e, and 7313f is six and the plurality of solenoids 7313a, 7313b, 7313c, 7313d, 7313e, and 7313f is located at vertices of a hexagon, respectively, the present invention is not limited thereto. For example, four or eight solenoids may be located at vertices of a rectangle around the first and second magnetic substances 7311 and 7312. Alternatively, eight solenoids may be located at vertices of an octagon. Each of the plurality of solenoids 7313a, 7313b, 7313c, 7313d, 7313e, and 7313f may be connected to the controller 230, and may be supplied with power from the controller 230 of FIG. 1 to generate a magnetic field. The conductive plate 7410 is located within the coverage of a magnetic field generated by the plurality of solenoids 7313a, 7313b, 7313c, 7313d, 7313e, and 7313f, and the first and second magnetic substances 7311 and 7312. The conductive plate 7410 is in no contact with the plurality of solenoids 7313a, 7313b, 7313c, 7313d, 7313e, and 7313f, and the first and second magnetic substances 7311 and 7312. The first conductive wire portion 7420 and the second conductive wire portion 430 pass among the plurality of solenoids 7313a, 7313b, 7313c, 7313d, 7313e, and 7313f, and are connected to the conductive plate 7410. The first and second conductive wire portions 7420 and 7430 are coated with the first and second insulating members 7423 and 7433, respectively, and thus, the first and second conductive wire portions 7420 and 7430 are also in no contact with the plurality of solenoids 7313a, 7313b, 7313c, 7313d, 7313e, and 7313f.

A total sum of magnitudes of magnetic fields generated by the plurality of solenoids 7313a, 7313b, 7313c, 7313d, 7313e, and 7313f, and the first and second magnetic substances 7311 and 7312 may be about 0.1 T to about 1 T. Magnetic fields occur due to the plurality of solenoids 7313a, 7313b, 7313c, 7313d, 7313e, and 7313f, and the first and second magnetic substances 7311 and 7312 and thus, each generated magnetic field may have a small magnitude.

The first fixing portion 7331 may be disposed between the conductive plate 7410 and the first magnetic substance 311, and the second fixing portion 7332 may be disposed between the conductive plate 7410 and the second magnetic substance 7312. The first and second fixing portions 331 and 332 may be made of a material aside from a conductive material.

The encapsulation material 7500 may be formed to mold the plurality of solenoids 7313a, 7313b, 7313c, 7313d, 7313e, and 7313f, the first and second magnetic substances 7311 and 7312, the conductive plate 7410, and the first and second fixing portions 7331 and 7332.

Figure 8:
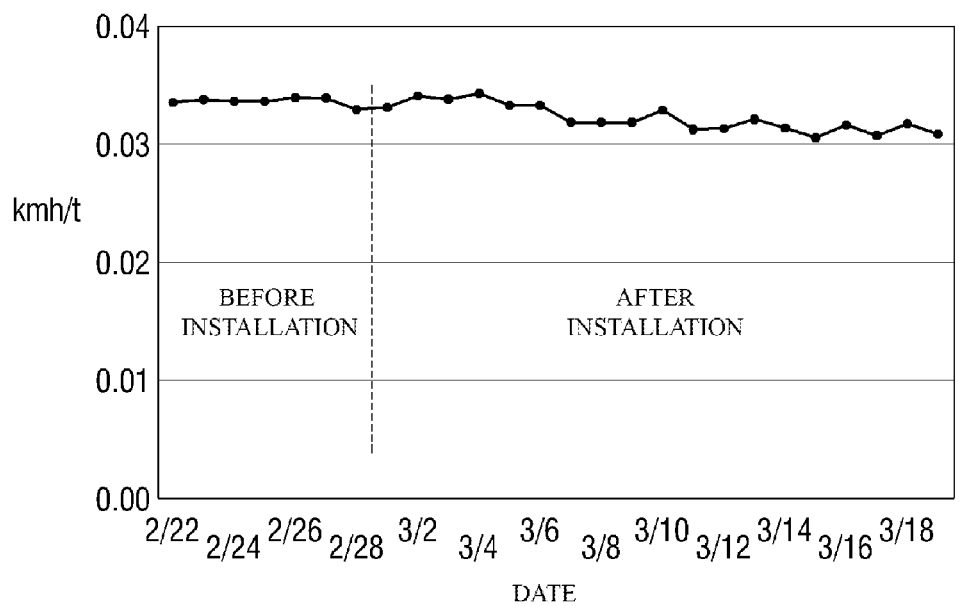
FIGS. 8 and 9 are graphs showing an effect of an apparatus for enhancing power efficiency according to an embodiment of the present invention.
Figure 9:
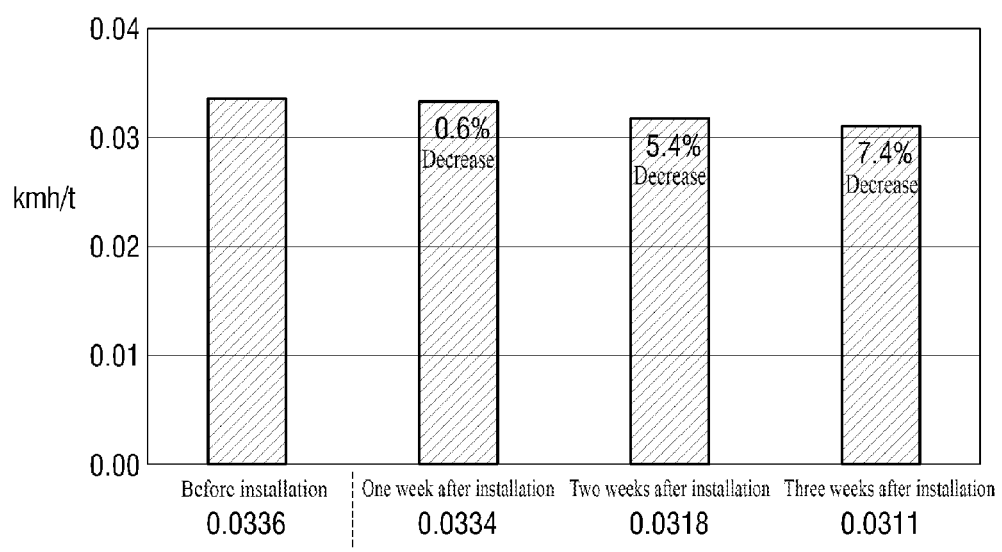

Hereinafter, an effect of the power efficiency enhancing apparatus 200 of FIG. 1 according to an embodiment of the present invention will be described with reference to FIGS. 8 and 9. FIGS. 8 and 9 are graphs showing an effect of the power efficiency enhancing apparatus 200 according to an embodiment of the present invention. In detail, FIG. 8 is a graph of a broken line with respect to Table 1 and FIG. 9 is a bar graph showing an effect of the present invention based on a week unit.

The following experiment was conducted to search into the effect of the power efficiency enhancing apparatus 200. The power efficiency enhancing apparatus 200 was connected to a power line (3-phase-and-4-line, and 380V) configured to supply power to the entire production line equipment (corresponding to the load 110 of FIG. 1), and an amount of power used by the production line equipment for a day and a yield produced by the production line equipment for a day were measured. Based on the measured amount of power and yield, an amount of power used over yield was calculated. An amount of power and a yield used by the production line equipment for a day slightly differ every day and thus, an amount of power used over yield was calculated to accurately verify the effect. A yield unit of a production line is ton and a unit for an amount of power is kwh.

TABLE 1

|  | Measured date | Yield (t) | Amount of power used (kwh) | Amount of power used over yield (kwh/t) |
|---|---|---|---|---|
| Before installation | 2/22 | 259,000 | 8,690.8 | 0.0336 |
|  | 2/23 | 259,000 | 8,736.4 | 0.0337 |
|  | 2/24 | 259,000 | 8,700.3 | 0.0336 |
|  | 2/25 | 260,000 | 8,728.5 | 0.0336 |
|  | 2/26 | 259,000 | 8,794.5 | 0.0340 |

TABLE 1-continued

|  | Measured date | Yield (t) | Amount of power used (kwh) | Amount of power used over yield (kwh/t) |
|---|---|---|---|---|
| After installation | 2/27 | 259,000 | 8,770.7 | 0.0339 |
|  | 2/28 | 265,552 | 8,739.7 | 0.0329 |
|  | 3/1 | 266,000 | 8,817.9 | 0.0332 |
|  | 3/2 | 259,000 | 8,823.1 | 0.0341 |
|  | 3/3 | 260,000 | 8,795.3 | 0.0338 |
|  | 3/4 | 259,000 | 8,878 | 0.0343 |
|  | 3/5 | 266,000 | 8,850 | 0.0333 |
|  | 3/6 | 266,000 | 8,853 | 0.0333 |
|  | 3/7 | 274,000 | 8,740 | 0.0319 |
|  | 3/8 | 274,000 | 8,708 | 0.0318 |
|  | 3/9 | 273,000 | 8,692 | 0.0318 |
|  | 3/10 | 266,000 | 8,741 | 0.0329 |
|  | 3/11 | 281,000 | 8,782 | 0.0313 |
|  | 3/12 | 280,000 | 8,759 | 0.0313 |
|  | 3/13 | 274,000 | 8,783 | 0.0321 |
|  | 3/14 | 280,000 | 8,787 | 0.0314 |
|  | 3/15 | 288,000 | 8,796 | 0.0305 |
|  | 3/16 | 281,000 | 8,883 | 0.0316 |
|  | 3/17 | 288,000 | 8,854 | 0.0307 |
|  | 3/18 | 281,000 | 8,913 | 0.0317 |
|  | 3/19 | 287,000 | 8,865 | 0.0309 |

The content of Table 1 is illustrated as a graph of FIG. 8.

Referring to Table 1 and FIG. 8, when installing the power efficiency enhancing apparatus 200 in the production line equipment, it can be verified that an amount of power used over yield in the production line equipment has decreased compared to before installation. The power efficiency enhancing apparatus 200 may enhance the drift velocity of free electrons flowing in the power line 120 and the conductive wire of the load 110. Such enhancement is achieved sequentially from production line equipment relatively close to the power efficiency enhancing apparatus 200. That is, to achieve the power efficiency enhancement effect over the entire production line equipment, a predetermined time is required. Accordingly, the power efficiency enhancement effect may not appear immediately after installing the power efficiency enhancing apparatus 200, and may begin to appear gradually after a predetermined period of time is elapsed.

FIG. 9 shows a comparison between an amount of power used over yield before installation and an amount of power used over yield after installation through week-unit averaging.

The average amount of power over yield during one week after installation was 0.0334 kwh/t and decreased by about 0.6% compared to 0.0336 kwh/t that is the average amount of power used over yield before installation. However, the average amount of power used over yield during two weeks after installation was 0.0318 kwh/t and decreased by about 5.4% compared to the average amount of power used over yield before installation. The average amount of power used over yield during three weeks after installation was 0.0311 kwh/t and decreased by about 7.4% compared to the average amount of power used over yield before installation. Considering that the production line equipment uses an amount of power corresponding to a few thousands of kwh per day, it can be verified that the power efficiency enhancing apparatus 200 has an excellent power efficiency effect.

Figure 10:
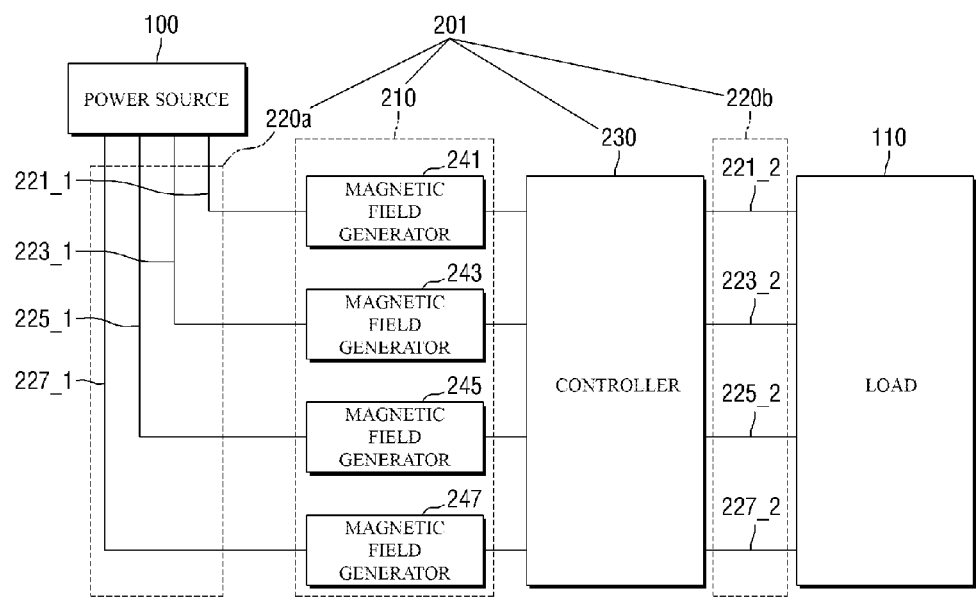
FIG. 10 is a block diagram illustrating an apparatus for enhancing power efficiency according to another embodiment of the present invention.

Hereinafter, a power efficiency enhancing apparatus 201 according to another embodiment of the present invention will be described with reference to FIG. 10. A description repeating the aforementioned description will be omitted and a description will be made based on a difference. FIG. 10 is a block diagram illustrating the power efficiency enhancing apparatus 201 according to another embodiment of the present invention.

Dissimilar to the power efficiency enhancing apparatus 200 of FIG. 1, the power efficiency enhancing apparatus 201 of FIG. 10 is connected in series between the power source 100 and the load 110. In detail, the power efficiency enhancing apparatus 201 includes a first conductive wire 220a, a second conductive wire 220b, the magnetic field generator 210, and the controller 230. In FIG. 10, as an example, the power source 100 supplies power in a 3-phase-and-4-line structure. Accordingly, the first conductive wire 220a includes four conductive wires, for example, first through fourth sub-conductive wires 221_1, 223_1, 225_1, and 227_1, and the second conductive wire 220b includes four conductive wires, for example, fifth through eighth sub-conductive wires 221_2, 223_2, 225_2, and 227_2. The number of conductive wires included in each of the first conductive wire 220a and second conductive wire 220b may vary based on a voltage phase provided from the power source 100.

The first conductive wire 220a is connected to the power source 100, passes the first magnetic field generator 241, and is connected to the controller 230. In detail, the first sub-conductive wire 221_1 passes the first magnetic field generator 241 and is connected to the controller 230, the second sub-conductive wire 223_1 passes the second magnetic field generator 243 and is connected to the controller 230, the third sub-conductive wire 225_1 passes the third magnetic field generator 245 and is connected to the controller 230, and the fourth sub-conductive wire 227_1 passes the fourth magnetic field generator 247 and is connected to the controller 230.

The second conductive wire 220b connects between the controller 230 and the load 110. In detail, since the first conductive wire 220a includes the first through fourth sub-conductive wires 221_1, 223_1, 225_1, and 227_1, the second conductive wire 220b also includes the fifth through eighth sub-conductive wires 221_2, 223_2, 225_2, and 227_2. That is, the number of conductive wires included in the first conductive wire 220a is equal to the number of conductive wires included in the second conductive wire 220b. The fifth sub-conductive wire 221_2 is connected to the first sub-conductive wire 221_1 through the controller 230, the sixth sub-conductive wire 223_2 is connected to the second sub-conductive wire 223_1 through the controller 230, the seventh sub-conductive wire 225_2 is connected to the third sub-conductive wire 225_1 through the controller 230, and the eighth sub-conductive wire 227_2 is connected to the sub-conductive wire 227_1 through the controller 230.

When the power efficiency enhancing apparatus 201 is connected in series between the power source 100 and the load 110 as illustrated in FIG. 10, the power efficiency enhancement effect may relatively quickly appear. When the power efficiency enhancing apparatus 200 is connected in parallel between the power source 100 and the load 110 as illustrated in FIG. 1, the notable effect in terms of power efficiency enhancement may appear after about two weeks is elapsed. However, when the power efficiency enhancing apparatus 201 is connected in series between the power source 100 and the load 110 as illustrated in FIG. 10, the notable effect in terms of power efficiency enhancement may appear even before two weeks is elapsed. Compared to resistance of the load 110, resistance of the power efficiency enhancing apparatus 201 is insignificant and thus, does not affect an operation of the load 110 although the power efficiency enhancing apparatus 201 is connected in series between the power source 100 and the load 110.

A shape of the magnetic field generator 210 of the power efficiency enhancing apparatus 201 of FIG. 10 and a shape of the first conductive wire 220a passing the magnetic field generator 210 may be configured to be the same as illustrated in FIGS. 2 through 7 and thus, a further description will be omitted here.

The controller 230 may control a voltage and current flowing in the first and second conductive wires 220a and 220b. For example, the controller 230 may prevent overcurrent of the first and second conductive wires 220a and 220b. In addition, the controller 230 is not limited to be placed between the magnetic field generator 210 and the load 110, but can be placed right after the power source 100.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. An apparatus for enhancing power efficiency, the apparatus comprising:
    a plurality of magnetic field generators configured to correspond to a plurality of power lines having different phases in a one-to-one manner, the plurality of magnetic field generators comprising a magnetic substance configured to generate a magnetic field;
    a plurality of conductive wires configured to pass the magnetic field, wherein first ends of the plurality of conductive wires are electrically connected in parallel to the plurality of power lines to which alternating current (AC) is applied; and
    a controller connected to second ends of the plurality of conductive wires, and configured to apply, to each of the plurality of the conductive wires, the same AC as an AC of each of the plurality of power lines connected to the plurality of conductive wires, and to prevent unexpected overcurrent and a surge from flowing into an electrical device,
    wherein the plurality of conductive wires comprise a conductive plate, and the conductive plate is disposed in a space in which the magnetic field is generated to be separate from the magnetic substance, and a first width of the conductive plate is the same as or greater than a second width of the plurality of conductive wires,
    wherein the plurality of conductive wires further comprise:
    a conductive wire portion coated with an insulating member, and
    the conductive plate is located within a coverage of magnetic fields generated by the plurality of magnetic field generators, and
    wherein the plurality of magnetic field generators further comprise:
    a fixing portion disposed between the magnetic substance and the conductive plate, and
    an encapsulation material configured to mold the magnetic substance, the fixing portion, and the conductive plate.

2. An apparatus for enhancing power efficiency, the apparatus comprising:
    a plurality of magnetic field generators configured to correspond to a plurality of power lines having different phases in a one-to-one manner;
    a plurality of conductive wires of which first ends are electrically connected in parallel to the plurality of power lines in a one-to-one manner, and configured to pass magnetic fields generated by the plurality of magnetic field generators, respectively; and
    a controller connected to second ends of the plurality of conductive wires, and configured to apply, to each of the plurality of the conductive wires, the same AC as an AC of each of the plurality of power lines connected to the plurality of conductive wires,
    wherein the plurality of conductive wires comprise:
    a conductive wire portion coated with an insulating member; and
    a conductive plate, and
    the conductive plate is located within a coverage of magnetic fields generated by the plurality of magnetic field generators, and
    wherein the plurality of magnetic field generators comprise:
    a magnetic substance configured to generate the magnetic field;
    a fixing portion disposed between the magnetic substance and the conductive plate, and
    an encapsulation material configured to mold the magnetic substance, the fixing portion, and the conductive plate.

* * * * *